(12) United States Patent
Brennan

(10) Patent No.: US 8,928,690 B2
(45) Date of Patent: Jan. 6, 2015

(54) METHODS AND SYSTEMS FOR ENHANCED QUALITY ANTI-ALIASING

(75) Inventor: Christopher Jude Brennan, Holden, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 320 days.

(21) Appl. No.: 13/425,102

(22) Filed: Mar. 20, 2012

(65) Prior Publication Data

US 2013/0249927 A1 Sep. 26, 2013

(51) Int. Cl.
*G06T 17/00* (2006.01)
*G09G 5/02* (2006.01)
*G09G 5/00* (2006.01)
*G06F 15/80* (2006.01)
*G06T 1/20* (2006.01)
*G06K 9/40* (2006.01)
*G06K 9/54* (2006.01)

(52) U.S. Cl.
USPC ........... 345/611; 345/428; 345/589; 345/614; 345/505; 345/506; 382/266; 382/269; 382/303; 382/304

(58) Field of Classification Search
USPC ......... 345/418, 428, 581, 589, 606, 611, 614, 345/616, 501–503, 505, 506, 530, 538, 545, 345/690; 382/162, 167, 254, 266, 268, 269, 382/274, 276, 300, 303, 304, 305, 307
See application file for complete search history.

(56) References Cited

U.S. PATENT DOCUMENTS

| | | | |
|---|---|---|---|
| 6,496,187 B1 * | 12/2002 | Deering et al. | 345/419 |
| 6,828,983 B1 | 12/2004 | Vijayakumar et al. | |
| 2001/0033287 A1 * | 10/2001 | Naegle et al. | 345/601 |
| 2008/0238920 A1 | 10/2008 | Brown et al. | |

FOREIGN PATENT DOCUMENTS

EP 1580694 A1 9/2005

OTHER PUBLICATIONS

International Search Report and Written Opinion for International Application No. PCT/US2013/032987, European Patent Office, Netherlands, mailed on May 22, 2013.

* cited by examiner

*Primary Examiner* — Wesner Sajous
(74) *Attorney, Agent, or Firm* — Volpe and Koenig, P.C.

(57) ABSTRACT

Provided herein is a method for implementing antialiasing including independently operating different portions of a graphics pipeline at different sampling rates in accordance with pixel color details.

20 Claims, 6 Drawing Sheets

METHODS AND SYSTEMS FOR ENHANCED QUALITY ANTI-ALIASING

BACKGROUND

1. Field of the Invention

The present invention relates to anti-aliasing (AA) performed in a computer system. More particularly, the present invention relates to techniques for efficiently performing AA.

2. Background Art

Aliasing is a well-known effect created by the appearance of undesired artifacts of the rendering process of an image frame displayed on a computer display. Edge aliasing is a particular type of aliasing that creates stair steps in an edge that should look smooth. An existing AA technique for alleviating the effects of edge aliasing is multi-sample anti-aliasing (MSAA). MSAA addresses edge aliasing by obtaining multiple samples of pixels used to generate intermediate points between pixels. The samples (or "sub-pixels") are averaged to determine the displayed pixel color value. The displayed edge in the multi-sampled image has a softened stair step effect.

Other traditional AA techniques include, for example, fast approximate anti-aliasing (FXAA) and morphological anti-aliasing (MLAA). FXAA and MLAA are performed only during post-processing of an AA application (resolve). These techniques locate discontinuities between pixels of an image, identify predefined patterns, and blend colors in the neighborhood of these patterns. Both of these techniques, however, are costly in terms of requiring a significant amount of information during post-processing, which requires larger amounts of memory bandwidth and compromises speed and quality.

In contrast to MSAA, FXAA and MLAA are incapable of determining the edge topology beneath a pixel. MSAA, on the other hand, includes this information. FXAA and MLAA, therefore, sacrifice quality by unnecessarily blurring the image. Consequently, performance is compromised by having to search through more pixels to discover an edge from which a coverage percentage can be extracted.

By way of background, computers (which include a large variety of form factors and devices such as, for example, laptops, netbooks, servers, televisions, handheld devices like smartphones and the like) are used in many applications. As computing systems continue to evolve, the graphical display requirements of the systems become more demanding. This is especially true in the area of three-dimensional (3D) graphics processing. In order to process 3D graphics images, the position of graphics primitives with respect to the display must be understood in all three dimensions. This includes the dimension of depth, often referred to as the Z dimension. The Z dimension describes the positioning of a video graphics primitive with respect to other video graphics primitives within the display frame in terms of the depth, or distance from the viewer, of the video graphics primitives.

Computer displays and other high resolution display devices such as high definition televisions (HDTVs), projectors, printers, and the like, present an image to the viewer as an array of individual picture elements, or pixels. The individual pixels are given a specific color, which corresponds to the color of the image at the location of the particular pixel. The pixels are closely spaced, and the viewer's visual system performs a filtering of individual pixel colors to form a composite image. If the partitioning of the image into individual pixel elements is performed properly, and the pixels are close enough together, the viewer perceives the displayed array of pixels as a virtually continuous image.

In many systems, graphical images for display are sampled, and the image is reconstructed based on the stored samples. When conservation of the detail is important, over-sampling, a type of AA also known as super-sampling, is typically used to avoid aliasing in the reconstructed graphical image. Over-sampling techniques are well known in the art. In an over-sampling system, multiple samples of each screen element, or pixel, are stored. Although each pixel is rendered using only a single color value, each of the samples for that particular pixel are used in generating the final color. In effect, a much more detailed, or higher-resolution, version of the image is stored within the computer, and this version is used to generate each of the colors for the pixels displayed on the screen.

To present a smooth and continuous image on the display, the entity processing the video graphics images must maintain a high rate of pixel processing. In order to achieve high rates of pixel processing, pixel data stored in memory must be retrieved, processed, and then stored back in the memory in an efficient manner. Pixel fragments that are received generally include multiple samples for a pixel where each sample includes a "Z" value and a color value. The memory bandwidth required to fetch the stored sample data and then rewrite the result of any blending operations that combine the fragment with the current pixel state can be substantial.

MSAA, for example, is memory intensive—requiring extra memory bandwidth and rendering time for each extra fragment internal to a pixel. Other traditional techniques create choke points within the graphics pipeline. For example, FXAA and MLAA assume there is only one color per pixel and perform a significant amount of post processing time based upon the one color per pixel assumption. FXAA and MLAA also consume additional processing time attempting to recover lost information internal to the pixel by searching around neighboring pixels. Although each of these techniques can be adjusted, depending on speed and quality requirements, making minor adjustments to the entire graphics pixel pipeline to optimize quality is inefficient.

BRIEF SUMMARY OF THE EMBODIMENTS

What is needed, therefore, are methods and systems to resolve the aforementioned deficiencies of traditional AA. What is also needed are methods and systems that optimize quality by enabling different sections of the graphics pixel pipeline to operate at different speeds, or rates (e.g., at different sampling rates), depending upon ultimate system requirements.

Embodiments of the present invention resolve the above noted deficiencies by providing enhanced quality aliasing for a given amount of storage and computational capability. More particularly, the embodiments provide enhanced quality AA without the need of additional storage capacity. As understood by those of skill in the art, the quality of AA is typically related to the number of stored samples. As more samples are stored, more memory is required.

More particularly, embodiments of the present invention, under certain circumstances, provide a method for implementing AA including independently operating different portions of a graphics pipeline at different sampling rates in accordance with pixel color details. More particularly, embodiments of the present invention provide a level of orthogonality. That is, as much or as little time can be expended on each part of the processing pipeline as necessary, depending upon the output quality needed.

Advantages provided by the embodiments and experienced by an end user, for example, include the realization of higher quality images (e.g., higher quality AA) and higher resolutions. This performance can be achieved on systems having much smaller memories than would typically be required to produce images with these higher qualities.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and enable a person skilled in the pertinent art to make and use the invention. Various embodiments of the present invention are described below with reference to the drawings, wherein like reference numerals are used to refer to like elements throughout.

DETAILED DESCRIPTION OF THE EMBODIMENTS OF THE INVENTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
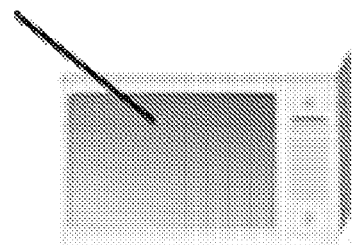
FIG. 1A is an illustration of graphics devices, including monitors, in which embodiments of the present invention can be practiced.
Figure 1A:
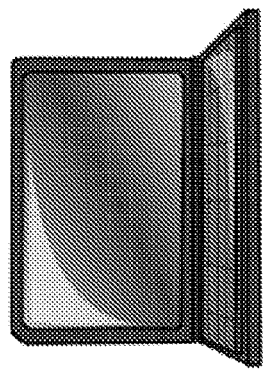
Figure 1A:
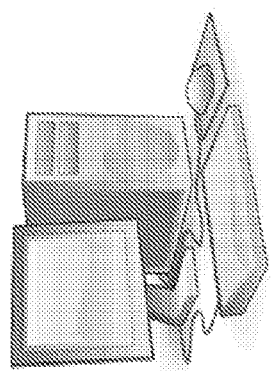

FIG. 1A is an illustration of graphics devices, including monitors, in which embodiments of the present invention can be practiced. For example, FIG. 1A includes a desktop computer 10, laptop computer 12, and smart phone device 14. The illustration of FIG. 1A is for purposes of illustration only, and not limitation. It can be appreciated by one of skill in the art that the embodiments of the present invention can be practiced in many different types of computers and graphics devices beyond those illustrated in FIG. 1A.

Figure 1B:
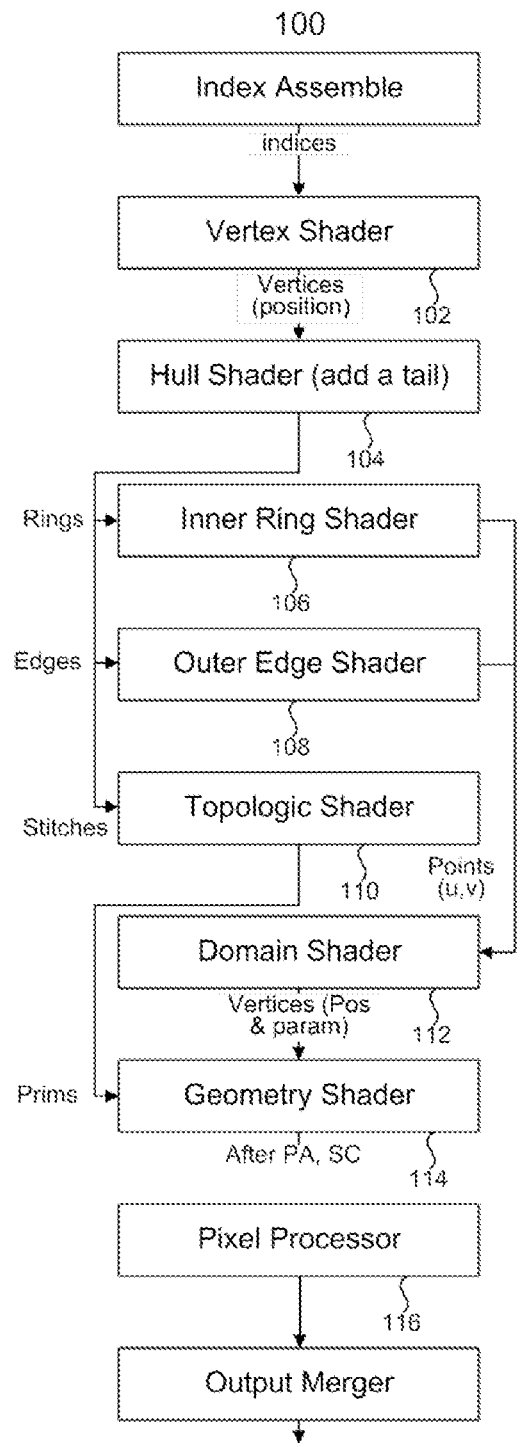
FIG. 1B is a graphics render pipeline, in accordance with embodiments of the present invention.

FIG. 1B is a graphics render pipeline 100, in accordance with an embodiment of the present invention. By way of example, pipeline 100 could be part of the internal structure of any of the graphics devices illustrated in FIG. 1A. Pipeline 100 includes a vertex shader 102, a hull shader 104, an inner ring shader 106, an outer edge shader 108, a topologic shader 110, a domain shader 112, a geometry shader 114, and a pixel shader 116. One skilled in the relevant arts will appreciate that other combinations of the shader functionality shown in FIG. 1B are contemplated within the scope of the present invention. Moreover, individual shader stages are generally optional, and their execution can be bypassed in an exemplary embodiment.

Each shader in pipeline 100 comprises computer program logic that performs a set of operations for graphics rendering on graphics hardware. Shaders are typically compact programs with a particular goal in mind (e.g., vertex manipulation, geometry manipulation, pixel manipulation, etc.).

Pixel shader 116 similarly operates on a per-pixel basis. Pixel shader 116 would typically be configured to apply effects such as interpolation and anisotropic filtering. It can also apply color or brightness effects.

Vertex shaders and pixel shaders, and more recently geometry shaders, are in common use in high end 3D graphics applications. These shader stages are available in Microsoft® Direct3D 10, and allow for basic tessellation functionality via geometry shader 114.

Figure 2A:
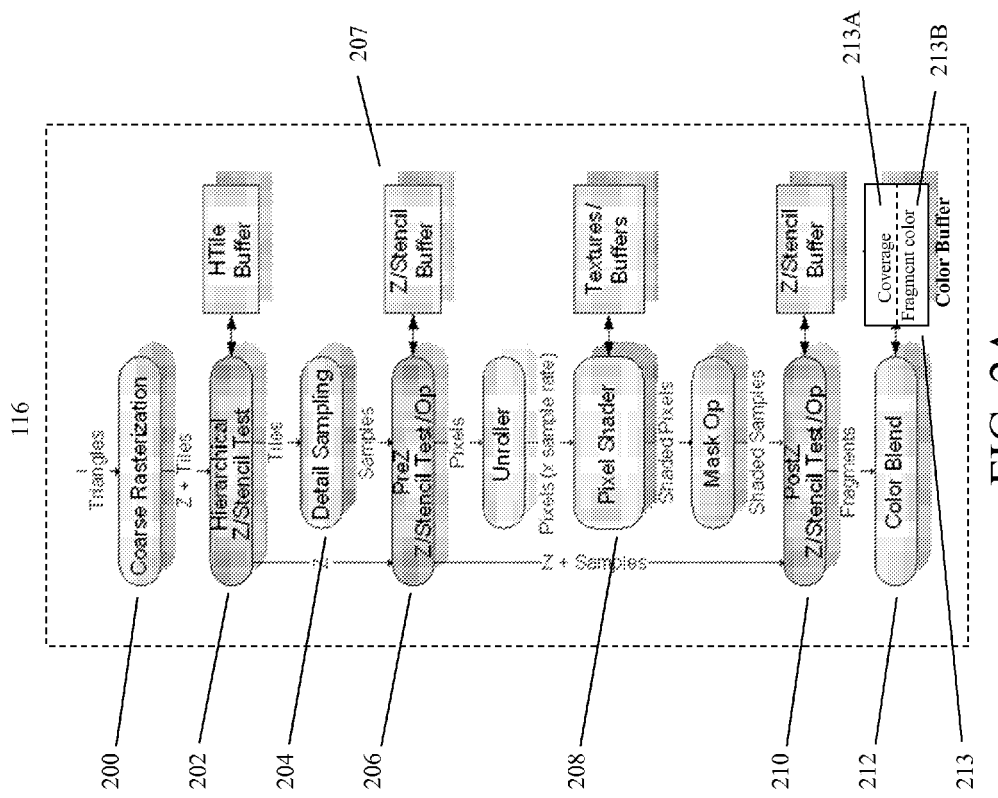
FIG. 2A is a more detailed block diagram illustration of the pixel processor shown in the illustration of FIG. 1B.

FIG. 2A is a more detailed block diagram illustration of pixel processor 116 shown in the illustration of FIG. 1B, according to an embodiment. In FIG. 2A, a coarse rasterization buffer 200 is configured to split primitives into 32×32 pixel super-tiles, and then 8×8 pixel tiles. Coarse rasterization buffer 200 also calculates a mask of intersecting quads (2×2 pixel units) within a tile. The particular arrangement of components within pixel module 116, are provided by way of example, and not limitation.

A hierarchical Z/stencil test buffer 202 is configured to compare tile information against, for example, per-tile HTile metadata, perform Hi-Z testing, (quick accept or reject of tile if possible), and update the HTile metadata in response thereto.

A detail sampling buffer 204 is provided for tiles that will not be accepted or rejected as a whole. Detailed sampling buffer 204, for example, walks the tile in SQuads (blocks of 16 samples) and creates sample-level coverage mask for primitives.

A pre-Z buffer 206 provides a pre-shader Z/stencil buffer testing. Pre-Z buffer 206 may reject and/or write individual samples to Z/Stencil buffer 202. Pre-Z buffer 206 is coupled to Z buffer 207.

A pixel shader 208 is configured to regroup SQuads into quads, perform pixel shading and optionally unroll for sample rate execution of the functionality of pixel shader 208.

Post-Z buffer 210 provides post-shader Z/stencil buffer testing. Post-Z buffer 210 finally rejects and/or performs writes if needed.

A color blend buffer 212 combines color values of fragments being processed with that of a pixel already stored in color buffer 213. For purposes of illustration, color buffer 213 is partitioned into segment 213A for storage of coverage data and segment 213B for fragment color data.

In an embodiment, the above noted AA orthogonality can be achieved by storage coverage information (e.g., fragment pointers) in color buffer segment 213A for a higher number of samples than unique colors (fragments), stored in segment 213B. Enhanced quality is achieved with this requirement of less storage. That is, instead of storing every single color in memory, embodiments of the present invention achieve economies of storage by only storing a smaller subset of the actual colors and selecting from the smaller subset of stored colors. Colors that are not stored are considered to be unknowns.

Figure 3:
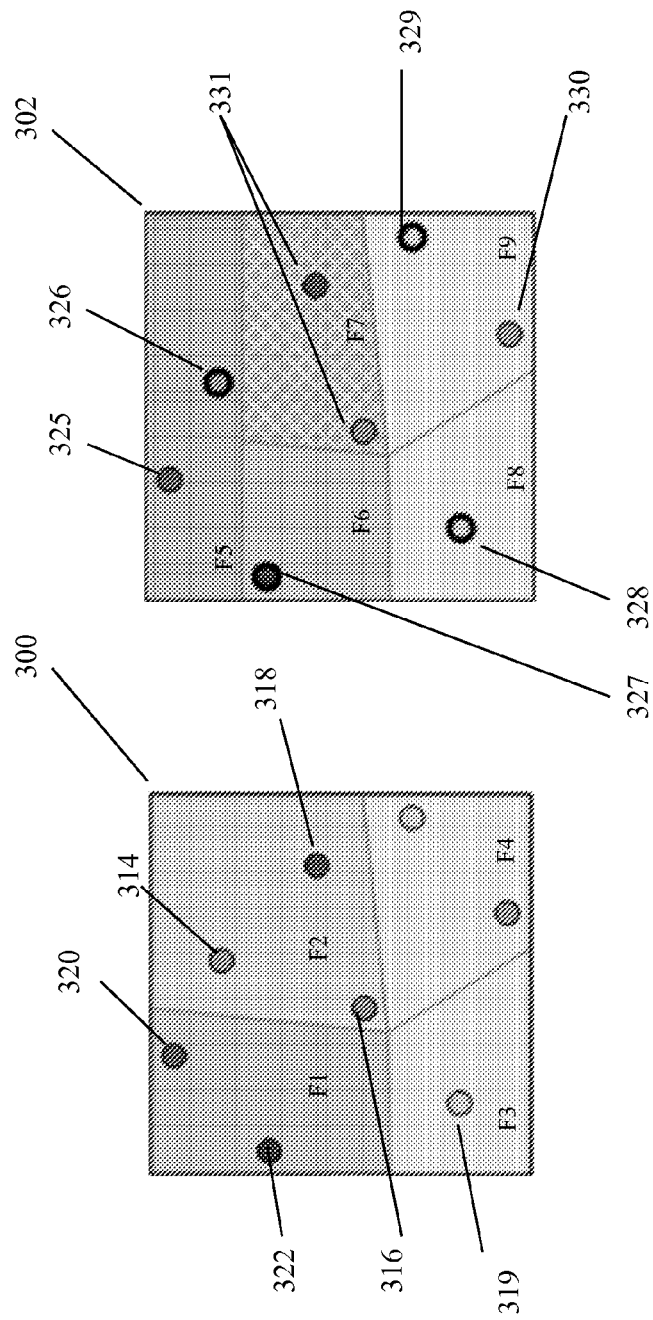
FIG. 3 is an illustration of coverage information storage in accordance with the embodiments.

The unknowns are resolved when the final pixel is generated. Thus, there will be colors that are known and stored, along with colors that are unknown and not stored. For the colors that are not stored, the unknown color must be calculated. Alternatively, in an embodiment, the unknown color(s) can be ignored and only the known colors can be used to calculate the final color. In the case where the unknown color must be calculated, these calculations are performed, for example, using the neighboring pixels. A variety of methods are available to perform the specific calculations. FIG. 3 is representative of an exemplary approach for storing a smaller subset of the coverage information for the colors in memory.

FIG. 3 is an illustration of coverage information storage for pixels, such as pixels 300 and 302, in accordance with the embodiments. In FIG. 3, pixel 300 is comprised of four fragments (i.e. colors), with a total of eight samples. For example, pixel 300 includes color fragments F1 (e.g., red), F2 (e.g., orange), F3 (e.g., yellow), and F4 (e.g., green). As understood by those of skill in the art, fragments are analogous to primitives, or in the example of FIG. 3—triangles that are abutting each other. Color fragment F2 includes individual color samples 314, 316, and 318. Color fragment F1 includes color samples 320 and 322, and so on. Within pixel 300, color fragment F2 is weighted heaviest of all other fragments, and includes three samples (of eight total), while fragment F3 includes only color one sample, sample 319.

Pixel 302, for example, includes four color fragments F5-F6 and F8-F9. Fragment F5 includes one standard color sample 325 and an applications program interface (API) exposed sample 326. Color fragments F6, F8 and F9 include API color samples 327, 328, and 329, respectively. Fragment F9 includes an additional standard sample 330. Color fragment F7 includes standard color samples 331.

By way of example, if a currently executing application requests four color samples/pixel of resolution, those four samples are guaranteed to be populated with valid (e.g., known) colors. Thus, if a fifth fragment is needed, such as fragment F7, and is drawn to the pattern within pixel 302, fragment F7 will be discarded. Fragment F7, which includes standard color samples 331, will be discarded because the other four fragments (F5-F6 and F8-F9) desirably all contain valid (e.g., known) colors. Fragment F7, however, does not include any valid API exposed samples. Therefore, color samples 331 of fragment F7, will be classified as unknown. Other methods, within the spirit and scope of the present invention, could use color similarity to choose which fragments to discard, as opposed to choosing fragments having the greatest number of color samples. However, using techniques such as color similarity, to prevent leaks no fragments should be merged unless they are identical, or at least near identical.

In the embodiment, when a subsequent resolve operation identifies the unknowns, it can bleed out the other fragment colors within the pixel. The resolve operation can also use neighboring pixel fragment colors to bleed into the pixel. By way of example, shader-based resolves are better suited for using neighboring pixels' colors, and are also within the spirit and scope of the present invention.

By using the additional coverage information, the above described technique enables the memory footprint of the color buffer 213 to be reduced while maintaining AA quality of the number of samples. When using the additional coverage information, however, the number of unique fragments should not exceed the number of known fragments. That is, the unique fragments should not exceed the footprint of the color buffer (e.g., segment 213B).

Many traditional AA techniques, such as FXAA and MLAA, use variations of other traditional techniques, such as deferred shading. Due to API constraints and bandwidth concerns, deferred shading is based upon one color/pixel. As discussed above, these techniques perform a significant amount of post processing to achieve color quality. In the end, these traditional approaches apply AA filtering techniques to eliminate aliased edges in an after the fact manner.

In addition to standalone applications, embodiments of the present invention are particularly well-suited for augmenting the performance of traditional techniques such as FXAA and MLAA. More specifically, and as described in greater detail below, embodiments of the present invention can be used to enhance the performance of existing techniques by providing more AA information for use during post-processing.

In standalone applications, however, embodiments of the present invention produce faster and higher quality AA results than standard hardware resolve approaches. As an aside, the traditional approaches are effective when used in the 4+ fragment cases (e.g., 4 colors per pixel). These traditional approaches, however, are less effective when operating at levels less than four colors per pixel. For example, in cases below four colors per pixel, neighboring pixels must be examined during post-processing to obtain color information for blending into the final pixel. Embodiments of the present invention are particularly well-suited to perform these blending operations in conjunction with the traditional techniques.

For example, when running FXAA and/or MLAA with 1 fragment (e.g., one color per pixel: 1×AA), 4×AA coverage, or 16×AA (extra coverage), the coverage information described above can be used during post-processing of traditional AA filtering, to further improve the AA results. Stated another way, embodiments of the present invention can be used in a hybrid approach to provide additional information to perform AA on previously post-processed information. By merging additional external coverage data with traditional post-processing information, the hybrid approach of the embodiment provides faster filtering and better quality.

MLAA, for example, requires the scanning of an image in a neighborhood around a pixel to locate the corresponding edge. That is, regions outside of the pixel must be examined in order to extrapolate the location of the edge. However, in the embodiments, additional coverage information is provided within the pixel, thus reducing the number of computations required for edge determination. Providing additional coverage information within the pixel is a much faster approach. Also, since the location of the edge can be determined more precisely, quality is enhanced.

As noted above, embodiments of the present invention can be used in a hybrid approach to augment the results of traditional techniques such as FXAA and MLAA. An advantage of a hybrid approach is that results of the present invention can be used to compliment the typically inconclusive results of the traditional approaches. The hybrid approach is referred to herein as augmentation. Using augmentation, AA information produced by FXAA and MLAA, and other traditional approaches, can be blended during FXAA/MLAA post-processing. Augmentation will produce more conclusive AA results more quickly and accurately.

During augmentation, coverage information is exposed to the augmentation AA application for integration with the traditional (MLAA and FXAA) algorithms. This integration facilitates more informed and deterministic post-processing results when compared with traditional approaches in a standalone mode.

Referring back to FIG. 2A, augmentation is implemented within graphics pipeline 116 between pixel shader 208 and post-Z buffer 210. In one embodiment, augmenting the post-processing of non-traditional AA approaches with extra coverage information can be achieved by allowing an application to import the coverage information into the pixel shader during post processing.

Augmentation, as performed within the embodiments, is particularly effective in scenarios involving opaque geometric images positioned behind a transparent image. One approach (transparency), for example, performs an analysis of alpha to mask samples to determine layers of transparency.

A slightly different approach performs an analysis of mask export samples to determine how many samples are needed to interpret from the mask export component within pixel shader 208.

In the exemplary transparency approach described above, the transparent layer could have any arbitrary amount of transparency. For example, the transparent layer could have 20%, 50%, 70%, or any other level of transparency. As understood by those of skill in the art, transparency is typically achieved in a rendered image by drawing the opaque layers first. The transparent images are blended on the top of opaque images.

Figure 2B:
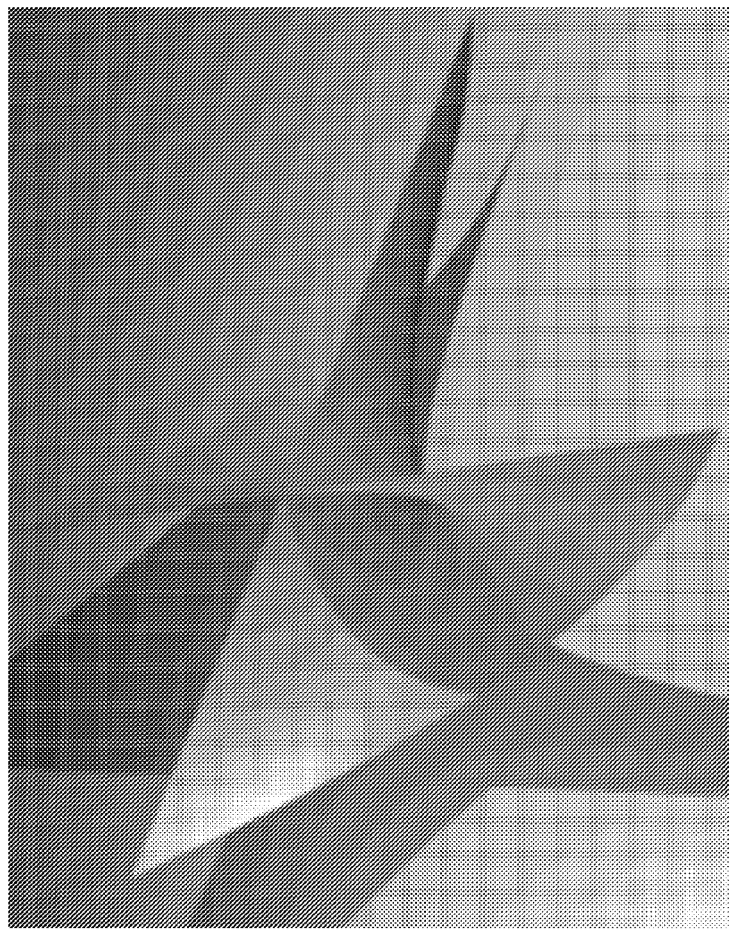
FIG. 2B is an illustration of a self-intersecting image.

Drawing opaque and transparent images is heavily dependent on the particular order in which the images are to be drawn. Achieving the correct order is resource intensive and particularly burdensome on software resources. This problem is compounded if multiple layers are involved and becomes intractable images are self-intersecting, such as image 250 illustrated in FIG. 2B. When performing AA for transparent images, it can also be problematic when self-intersecting images can be arbitrarily animated and/or rotated.

Given the challenges associated with drawing and performing AA on transparent images, there is a need for order independent transparency. Although a variety of traditional software methods provide order independent transparency, these methods are typically expensive. In an embodiment, transparency is achieved without ordering and without use of any particular software methodology.

In an illustrious embodiment of the present invention, every color sample is stochastically lit, or not lit, based on a percentage of coverage. For example, if a large number of color samples are associated with a pixel, 30% of the samples could be lit, emulating 30% of the coverage. In this manner, when the resolve is performed, the correct transparency is produced since 30% of the samples contained the transparent color and the remaining 70% contained the opaque color. These samples can then be stored independently.

In an embodiment, the ability to store samples independently creates additional key flexibilities. For example, some color sample cases may not require the application of more intensive AA techniques, such as extra edge antialiasing or use of detail walking performed, for example, within rasterizer 200 of FIG. 2A. In other cases, there could be a need for a small amount of Z-samples but, at the same time, a large number of coverage samples might be needed. Being able to treat different cases differently, with respect to the amount of AA applied, enables the system to optimize precision in small increments. In the embodiments, this independence (e.g., orthogonality) and flexibility is achieved by providing the ability to dynamically tailor the amount of AA to the specific sampling case at hand.

Again, referring to FIG. 2A, the AA orthogonality aspect of the embodiments enables the placement of emphasis, for example, on coverage storage without the concern of slowing down the entire graphics pipeline to perform bandwidth intensive Z-tests. Traditionally, these Z-tests that require the use of anyone of pixel processing modules 202-210 of FIG. 2A. More specifically, different sections of the pixel processing pipeline 200-212 can be configured to dynamically operate independently at different sampling rates by implementing different aspects of AA in accordance with specified sampling requirements.

In an embodiment, the need for storing large amounts of color samples is eliminated. Instead, a greater number of coverage samples can be stored, reducing the usage time of rasterization module 200 to perform edge detection. This process permits guiding the hardware to devote appropriate processing time in the right segment of the pipeline—optimizing speed and quality.

Other aspects of the embodiments enable application of unique AA techniques to curves and other objects that have paths abutting each other. In these aspects, by way of example, rasterizer 200, using coverage information, can be dynamically configured to set the edge detection to an AA rate of 16 samples per pixel (e.g., 16×AA) while other portions of the pipeline (e.g., modules 202-212) are running at an 1×AA rate. This approach relies on coverage information within rasterizer 200 to produce well-defined anti-aliased curves rather than relying on hardware to make this determination.

Additionally, the pipeline can dynamically adjust the amount of processing time devoted to edge detection, Z testing, pixel shader iteration and the coverage masking operation on each subsection of every primitive. This is possible, for example, when coarse geometry rasterization and hierarchical-Z tests determine that an edge is possible as the triangle is rasterized and shaded.

Thus, using AA augmentation as defined herein, one portion of the pipeline can run at a high AA level while another portion of the pipeline runs at a lower AA rate. At the same time, the memory footprint is minimized. Embodiments of the present invention offer several techniques for implementing independent sampling rates for different sections of the pipeline.

By way of example, one approach for implementing independent pipeline (e.g., within pipeline processor 116) sampling rates can occur in the following exemplary manner:

In one exemplary approach, the pipeline only slows down at the point where finer processing is needed:
  i. incoming sample data is replicated up to match: {0, 1, 2, 3}->{0, 1, 2, 3, 0, 1, 2, 3}
    1. Ex: rasterization (detail sampler) sample count is lower than multiple render target (MRT) sample count ii. speed of interior geometry matches 1×AA rates, intersections run at Z sample rates, and edges run at detail sample rates If a stage wants coarser detail, it uses only the lower index samples
  a. Ex: Z/stencil (e.g., modules 202-210) sample count lower than current pixel coverage mask sample count
  b. hardware ensures that power of 2 subset of lower samples is acceptable
    i. replicating up samples and data, doing a test or operation, then examining the bottom 2N samples to ensure replication had no adverse effects In the example above, samples 0, 1, 2, 3 were added and replicated as 0, 1, 2, 3, 0, 1, 2, 3. In other words, if sample 0 is lit, then samples 0 and 4 are also lit. Thus, at any point in the pipeline whenever an increase in the number of samples is desirable, the exemplary approach above can be used. In this example, by way of summary, if it is desirable to add samples, the available samples can be (a) analyzed, (b) duplicated, and (c) concatenated together until the number of samples needed is produced.

Correspondingly, if it is desirable to decrease the number of samples, samples from the bottom of the pipeline can be analyzed. This process avoids approaches that attempt to capture every other color sample. In an embodiment, the bottom sample can be used to perform, in essence, a reversible transformation. By way of example, one exception to this approach may be the case where it is desirable to logically OR together the upper half and the lower half, so that if either side is lit, the other side is correspondingly considered to be lit. This emulates, for example, operation of the rasterization stage 200.

The exemplary approaches above provide high-level rules for up-sampling and down-sampling during different stages of the graphics pipeline that are applicable to all of the other pipeline stages.

In an embodiment, other aspects of augmentation can be dynamically and independently implemented in different sections of the graphics pipeline and include features such as interpolation of compressed Z. Interpolation of compressed Z is a technique for storing Z as planar information to create a smaller footprint. For example, in an 8×8 pixel region, instead of storing the Z value for every single sample, the compressed Z approach merely stores the Z plane. This approach creates a planar description of Z, thus, facilitating the interpolation of any position on that plane whether that point would have been explicitly stored or not.

Consider the example of where (a) only one sample of Z is being stored, (b) an interpolate compress Z set is available, and (c) there are two intersecting geometric images with the ability of storing 16 samples of coverage. In this case, even though only one sample of Z is stored, it is stored in a planar fashion. Therefore, an incoming plane can be analyzed and compared against the stored Z (definitional) plane to generate a 16 sample intersection. Even though the Z buffer only has enough storage for one Z sample, because this Z sample is in planar representation, via interpolation of compressed Z, the stored Z sample plane can be used to produce a high-quality 16 sample intersection without any additional memory footprint.

In another example, if 1×AA depth footprints are desired, because of techniques such as the interpolation of compressed Z technique described above, 8×AA data can be used or stored for a particular tile. As the tile becomes more complicated, however, it can eventually blow out the footprint for that tile, significantly complicating its storage. In an embodiment, if this blowout occurs, the sample data will dynamically drop down to 4×AA, then drop down to 2×AA, and eventually down to 1×AA where it is no longer too complicated to store. Since graphics pipeline 116 has the ability of adapting to any particular sample rate at any particular time, the exemplary 8×AA tile can undergo all the Z-testing consistent with high-quality 8×AA Z coverage. In an embodiment, however, it will only undergo the 8×AA testing only to the extent that it is compressible within the allowable footprint. At this point, the pipeline makes dynamic adjustments based upon the available memory footprint.

Other embodiments of the present invention include features such as dynamic color fragment selection to provide enhanced quality AA. By way of example, dynamic color fragment selection provides a user with the ability to use and retain only the largest remaining fragment that most significantly contributes to image accuracy and quality. Using traditional approaches, and in most cases, the preference is to retain the fragments that include the API exposed samples.

Figure 4:
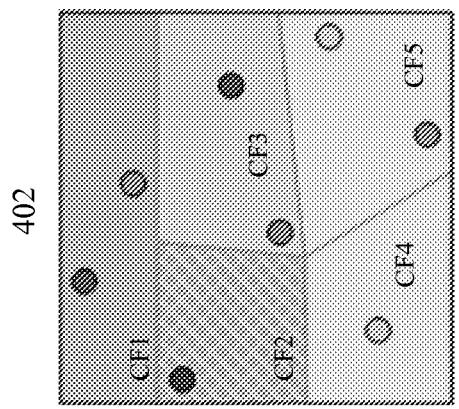
FIG. 4 is an illustration of dynamic, fragment selection in accordance with the embodiments.
Figure 4:
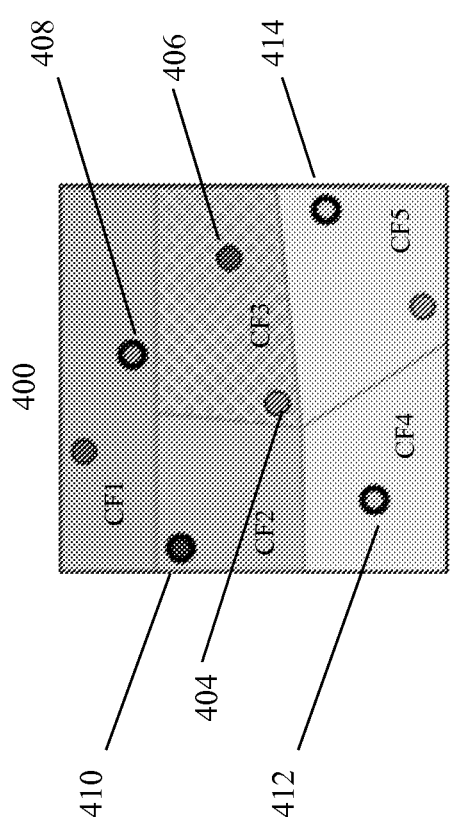

FIG. 4 is an exemplary illustration of dynamic color selection in accordance with an embodiment. In FIG. 4, pixel 400 includes color fragments CF1-CF5. As illustrated, fragment CF3 includes standard color samples 404 and 406. CF1 and CF2 include API exposed samples 408 and 410, respectively. Fragments CF4 and CF5 include API samples 412 and 414, respectively. Using traditional approaches, fragment CF3 would be discarded, even though it's the largest fragment among fragments CF1-CF5 because each of the API samples 408-412 has been identified, or validated. In terms of the final color of the rendered image, however, the largest fragment could contribute most significantly because it includes two color samples. All of the other color fragments include only one color sample, except for fragment CF1, which includes two color samples.

In accordance with an embodiment, fragment CF3 could be retained instead of discarded as illustrated in the case of pixel 402. Instead, either of fragments CF2 or CF4 could be discarded since each fragment has only one color sample. Since each of the fragments CF2 and CF4 has only one color sample, each of these fragments would contribute less to the final color of the image. In the case of pixel 402, fragment CF2 is discarded and fragment CF3 (discarded in pixel 400) is retained. In practical terms, it would be most efficient to discard the incoming sample, especially if it is equivalent to the smallest sample, so that no other color writes will occur. By retaining fragment CF3 in pixel 402, pixel 402 will have a more accurate content than pixel 400.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
operating a plurality of pixel processing modules of a pixel processor of a graphics pipeline at different sampling rates in accordance with one or more pixel color details;
storing coverage information in a color buffer for a plurality of sample;
adjusting the sampling rates of one or more of the plurality of pixel processing modules, wherein the operating, storing, and adjusting comprise a first anti-aliasing operation; and
activating a second anti-aliasing operation that utilizes the stored coverage information also used during the first anti-aliasing operation.

2. The method of claim 1, wherein the operating, occurs dynamically.

3. The method of claim 1, wherein the activating occurs during a post-processing stage of the first anti-aliasing operation.

4. The method of claim 1, wherein the operating comprises selecting a largest color fragment from among a plurality of color fragments to construct a final pixel color.

5. The method of claim 1, further comprising:
generating an image based on the operating; and
storing the image in a memory.

6. The method of claim 1, further comprising:
displaying an image based on the operating.

7. The method of claim 1, further comprising:
storing a subset of colors associated with the plurality of samples in the color buffer.

8. A non-transitory computer readable medium having stored thereon computer executable instructions that, when executed by a computing device, cause the computing device to perform operations comprising:
operating a plurality of pixel processing modules of a pixel processor of a graphics pipeline at different sampling rates in accordance with pixel color details,
storing coverage information in a color buffer for a plurality of samples;
adjusting the sampling rates of one or more of plurality of pixel processing modules, wherein the operating, storing, and adjusting comprise a first anti-aliasing operation; and
activating a second anti-aliasing operation that utilizes the stored coverage information also used during the first anti-aliasing operation.

9. The non-transitory computer readable medium of claim 8, wherein the operating occurs dynamically.

10. The non-transitory computer readable medium of claim 8, wherein the activating occurs during a post-processing stage of the first anti-aliasing operation.

11. The non-transitory computer readable medium of claim 8, wherein the operating comprises selecting a largest color fragment from among a plurality of color fragments to construct a final pixel color.

12. The non-transitory computer readable medium of claim 8, further comprising:
generating an image based on the operating; and
storing the image in a memory.

13. The non-transitory computer readable medium of claim 8, further comprising:
displaying an image based on the operating.

14. The non-transitory computer readable medium of claim 8, further comprising:
storing a subset of colors associated with the plurality of samples in the color buffer.

15. A graphics processing unit (GPU) comprising a plurality of pixel processing modules of a pixel processor of a graphics pipeline, the pixel processor configured to:
operate the plurality of pixel processing modules at different sampling rates in accordance with one or more pixel color details;
store coverage information in a color buffer for a plurality of samples;
adjust the sampling rate of one or more of the plurality of pixel processing modules, wherein the operate, store, adjust comprise a first anti-aliasing operation; and
activate a second anti-aliasing operation that utilizes the stored coverage information also used during the first anti-aliasing operation.

16. The GPU of claim 15, the pixel processor is configured to:
generate an image based on the plurality of pixel processing modules operating at the different sampling rates; and
store the image in a memory.

17. The GPU of claim 15, the pixel processor is configured to display an image based on the plurality of pixel processing modules operating at the different sampling rates.

18. The GPU of claim 15, wherein the activation of the second anti-aliasing operation occurs during a post-processing stage of the first anti-aliasing operation.

19. The GPU of claim 15, wherein the plurality of pixel processing modules operating at the different sampling rates comprises the pixel processor selecting a largest color fragment from among a plurality of color fragments to construct a final pixel color.

20. The GPU of claim 15, the pixel processor further configured to:
store a subset of colors associated with the plurality of samples in the color buffer.

* * * * *

UNITED STATES PATENT AND TRADEMARK OFFICE
CERTIFICATE OF CORRECTION

PATENT NO. : 8,928,690 B2  
APPLICATION NO. : 13/425102  
DATED : January 6, 2015  
INVENTOR(S) : Christopher J. Brennan Page 1 of 1

It is certified that error appears in the above-identified patent and that said Letters Patent is hereby corrected as shown below:

IN THE CLAIMS

Claim 1, column 11, line 7, change "sample" to -- samples --.

Claim 1, column 11, line 13, delete "also used".

Claim 2, column 11, line 15, delete ",".

Claim 8, column 11, line 40, after "more of" insert -- the --.

Claim 8, column 11, line 45, delete "also used".

Claim 15, column 12, line 25, after "store," insert -- and --.

Claim 15, column 12, line 28, delete "also used".

Signed and Sealed this  
Sixteenth Day of June, 2015

Michelle K. Lee  
*Director of the United States Patent and Trademark Office*